(No Model.)
W. M. SMITH.
CASKET ORNAMENT.
No. 270,496. Patented Jan. 9, 1883.
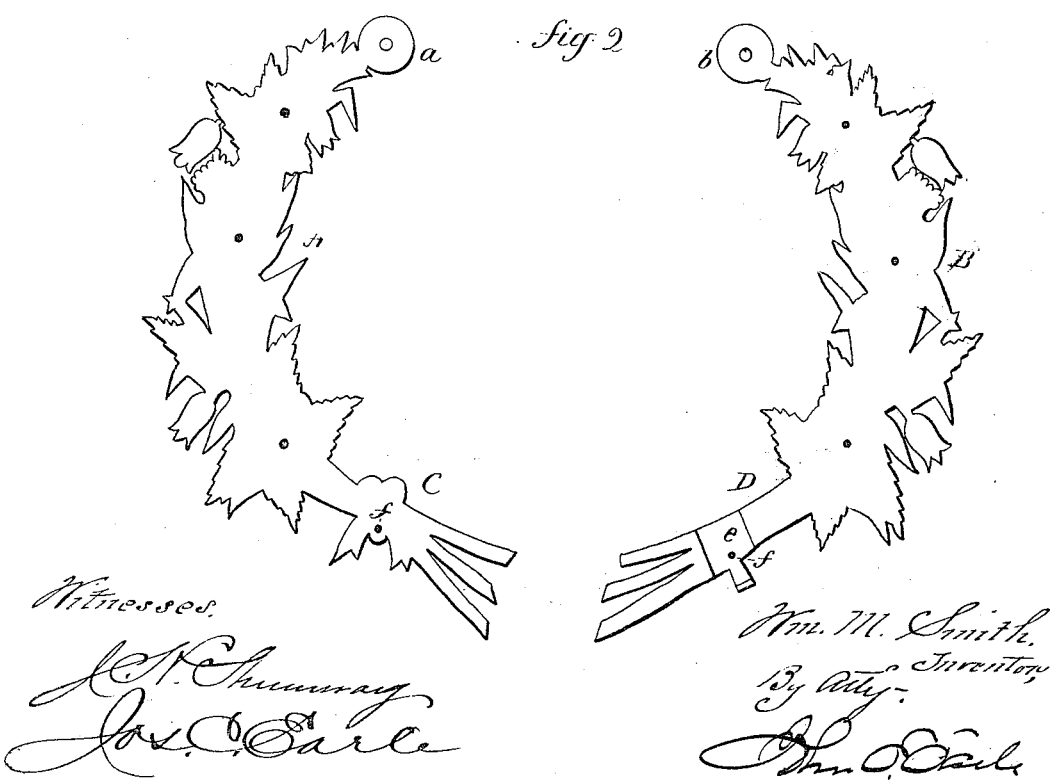

UNITED STATES PATENT OFFICE.

WILLIAM M. SMITH, OF MERIDEN, CONNECTICUT, ASSIGNOR TO THE MERIDEN BRITANNIA COMPANY, OF SAME PLACE.

CASKET ORNAMENT.

SPECIFICATION forming part of Letters Patent No. 270,496, dated January 9, 1883.

Application filed October 2, 1882. (No model.)

*To all whom it may concern:*

Be it known that I, WM. M. SMITH, of Meriden, in the county of New Haven and State of Connecticut, have invented a new Improvement in Casket Ornaments; and I do hereby declare the following, when taken in connection with accompanying drawings and the letters of reference marked thereon, to be a full, clear, and exact description of the same, and which said drawings constitute part of this specification, and represent, in—

Figure 1, a front view of the wreath complete and as attached; Fig. 2, the two parts detached; Fig. 3, a transverse section through the ornament F; Fig. 4, a longitudinal section through the crossing of the stems.

This invention relates to an improvement in the construction of ornaments for caskets and funeral purposes, and particularly to that class which are made in the form of a wreath. These ornaments are cast in metal so as to present the desired floriated surface, and heretofore the wreath has been made complete in a single piece. When cast in a single piece it is impossible to give to the flowers, leaves, and other parts the "under-cut" which is necessary to make a close imitation. Hence the wreaths as usually constructed are clumsy affairs.

The object of my invention is to construct the wreath so that it may be cast in an inclined or partial edgewise position, whereby a sharp under-cut may be made; and it consists in the construction as hereinafter described, and more particularly recited in the claims.

I construct the wreath in two parts, A B, the one representing the right-hand and the other the left-hand part, the stem C of the one part, A, constructed to cross the stem D of the other part, B, and lie in a recess, $e$, made in the surface of the stem D, to locate the stem C in its proper relation to the stem D, and the tips each provided with an ear, respectively, $a\ b$, so that one ear will lie upon the other, and at points on the floriated surface where the flowers, buds, or projecting parts are to be placed I make holes, as indicated in Fig. 2, and form seats on the surface for whatever is to be attached. In the representation the attached parts are. the flowers E F and the bud G. These are secured by a screw or rivet through the holes in the base. The surface of the wreath or base is ornamented by any desirable representation of plants, flowers, foliage, &c.

The parts to be attached may represent full-blown flowers, buds, butterflies, birds, or any of the many emblems employed for funeral ornaments. These ornaments may be made independent of the wreath, to be attached by the seller to correspond to the taste of the purchaser or the occasion for which the wreath is to be used. The stems are lapped, as seen in Fig. 1, secured by a tack through corresponding perforations in the parts, and by a tip ornament at the center, which may screw through the two ears $a\ b$, and as seen at $d$, Fig. 1.

By making the wreath in two parts the pattern can be arranged in the mold having an incline so as to produce a sharp, clear, undercut edge to the leaves and other parts. Again, by making the wreath in two parts a variety of wreaths may be produced by making several different parts for each half, any two of which may be combined to make a complete wreath, it only being necessary that they shall be constructed at their stems and tips so as to be united.

I claim—

1. The herein-described casket ornament, consisting of the metal wreath cast in two parts, each representing branches, the stems of which cross and form a point for attachment at the bottom, and the tips constructed to overlap each other and form a means of securing at that end, substantially as described.

2. A wreath cast in two parts, the stems crossing each other at the point of connection at the bottom, and with tips to overlap each other at the top, and detachable ornaments upon its floriated surface, substantially as described.

WILLIAM M. SMITH.

Witnesses:
JOHN M. HARMON,
ARTHUR BRADSHAW.